United States Patent [19]
Shustack et al.

[11] Patent Number: 6,048,911
[45] Date of Patent: Apr. 11, 2000

[54] COATED OPTICAL FIBERS

[75] Inventors: Paul J. Shustack, West Chester; Daniel A. Wilson, Cincinnati, both of Ohio

[73] Assignee: Borden Chemical, Inc., Columbus, Ohio

[21] Appl. No.: 08/989,618

[22] Filed: Dec. 12, 1997

[51] Int. Cl.[7] .............................. C08F 2/46; C08G 3/28; D02G 3/00; B32B 9/00

[52] U.S. Cl. .............................. 522/96; 522/91; 522/44; 522/46; 522/18; 522/25; 522/148; 522/120; 522/121; 428/378; 428/391; 428/380

[58] Field of Search ................ 522/96, 44, 46, 522/42, 18, 25, 91, 148, 120, 121; 428/378, 391, 380

[56] References Cited

U.S. PATENT DOCUMENTS

| | | | |
|---|---|---|---|
| 4,472,021 | 9/1984 | Ansel et al. | 350/96.23 |
| 4,889,901 | 12/1989 | Shama et al. | |
| 5,128,391 | 7/1992 | Shustack | 522/92 |
| 5,146,531 | 9/1992 | Shustack | 385/128 |
| 5,182,786 | 1/1993 | Kinaga et al. | |
| 5,219,896 | 6/1993 | Coady et al. | 522/96 |
| 5,268,984 | 12/1993 | Hosoya et al. | 385/128 |
| 5,336,563 | 8/1994 | Coady et al. | 428/375 |
| 5,352,712 | 10/1994 | Shustack | 522/31 |
| 5,371,058 | 12/1994 | Wittig, Jr. et al. | 503/206 |
| 5,441,813 | 8/1995 | Sano et al. | 428/375 |
| 5,491,178 | 2/1996 | Swedo et al. | 522/74 |
| 5,502,145 | 3/1996 | Szum | 528/28 |
| 5,514,727 | 5/1996 | Green et al. | 522/15 |
| 5,524,164 | 6/1996 | Hattori et al. | 385/114 |
| 5,527,835 | 6/1996 | Shustack | 522/42 |
| 5,536,529 | 7/1996 | Shustack | 427/163.2 |
| 5,538,791 | 7/1996 | Shustack | 428/392 |
| 5,561,730 | 10/1996 | Lochkovic | 385/114 |
| 5,562,985 | 10/1996 | Sano et al. | 428/375 |
| 5,639,846 | 6/1997 | Shustack | 528/44 |
| 5,650,231 | 7/1997 | Barraud et al. | |
| 5,744,514 | 4/1998 | Shustack | 522/42 |

FOREIGN PATENT DOCUMENTS

| | | |
|---|---|---|
| 0 116 140 A1 | 8/1984 | European Pat. Off. |
| 0 407 004 A2 | 1/1991 | European Pat. Off. |
| 0 527 266 A1 | 2/1993 | European Pat. Off. |
| 0 565 798 A2 | 10/1993 | European Pat. Off. |
| 0 780 712 A2 | 6/1997 | European Pat. Off. |
| 93/21248 | 10/1993 | WIPO |
| 96/11965 | 4/1996 | WIPO |

OTHER PUBLICATIONS

International Search Report for PCT/US98/11676 dated Oct. 20, 1998.

CoatOsil 3503, OSi Specialties, A Witco Company Product Sheet (undated).

Byk–371, BYK Chemie Product Sheet (undated).

*Primary Examiner*—James J. Seidleck
*Assistant Examiner*—Sanza L. McClendon
*Attorney, Agent, or Firm*—Dinsmore & Shohl LLP

[57] ABSTRACT

Coated optical fibers comprise a glass optical fiber and a radiation-cured coating formed from a radiation-curable liquid coating composition. The liquid coating composition comprises at least one aliphatic urethane acrylate oligomer, at least one acrylated or methacrylated compound selected from the group consisting of isobornyl acrylate, isobornyl methacrylate, alkanediol diacrylate, alkanediol dimethacrylates, alkoxylated derivatives thereof, and mixtures thereof, and a photoinitiator. In one embodiment, the compositions further include a silicone compatibility agent which reduces the coefficient of friction of the radiation-cured coating without disadvantageously effecting other physical properties of the liquid coating compositions or the cured coating, and particularly without disadvantageously effecting the optical clarity of the liquid coating compositions. In a second embodiment, the liquid coating compositions further comprise at least one silicone compatibility agent and at least one functionalized silicone compound which reduces the coefficient of friction of the radiation-cured coating while additional advantageous physical properties of the liquid coating composition and the cured coating, particularly optical clarity, are maintained. The liquid coating composition exhibits a UV absorbance at 500 nm relative to distilled water of less than about 0.04.

38 Claims, No Drawings

COATED OPTICAL FIBERS

FIELD OF THE INVENTION

The present invention is directed to coated optical fibers wherein the coating is formed from a radiation-curable liquid coating composition. More particularly, the invention is directed to optical fibers provided with a radiation-cured coating which exhibits an advantageous combination of physical properties, including a reduced coefficient of friction and good optical clarity.

BACKGROUND OF THE INVENTION

Optical fibers which are strong and have very few intrinsic defects are suitable for use for light transmission. However, optical fibers are very easily flawed by exposure to environmental conditions, including dust and moisture, and even small flaws can significantly reduce the strength of a fiber, rendering the fiber brittle and easily broken by a weak external force. Accordingly, optical fibers have conventionally been provided with at least one resin coating, preferably immediately after preparation of the optical fibers, to protect the fibers from exposure to conditions which would cause detrimental defects.

At least two resin coatings are often provided on an optical fiber, namely a primary or buffer inner coating and a secondary outer coating. Generally, the primary inner coating is applied directly to the glass fiber and, when cured, forms a soft, rubbery material which serves to cushion and protect the fiber by relieving stresses which are created when the fiber is bent, cabled or spooled. Such stresses might otherwise induce microbending of the fibers and cause undesirable attenuation of light traveling through the fibers. The secondary outer coating is usually applied directly over the primary coating and, when cured, forms a hard, tough outer layer which protects the glass fiber from abrasion, moisture and other effects which can damage the glass fiber. The Shustack U.S. Pat. Nos. 5,146,531 and 5,352,712 disclose optical fibers containing both primary and secondary coatings and optical fibers containing only the secondary outer coatings.

In order to provide coated optical fibers which are suitable for use under various conditions, the coatings which are applied to the glass fibers must exhibit certain combinations of desirable physical properties. For example, the primary coating must maintain adequate adhesion to the glass fiber during thermal and hydrolytic aging, yet be strippable for splicing purposes. The modulus of the primary coating must be low to cushion and protect the fiber, particularly through a wide temperature range to which the coated fiber may be exposed during its lifetime. The primary coating should also have a relatively high refractive index and high resistance to moisture.

The secondary coating should provide a hard protective layer which protects the glass fiber during processing and use. The secondary coating should therefore have a high glass transition temperature, i.e., at least about 50° C., and a high modulus, i.e., at least about 40,000 psi and more preferably at least about 70,000 psi. The secondary coating, like the primary coating, should also exhibit high moisture resistance, a high refractive index, and good optical clarity.

Various primary and secondary coatings for optical fibers are known in the art. While the inner primary coating may be omitted, virtually all optical fibers require the hard protective secondary outer coating. As the optical fibers are formed by drawing, they are typically coated with both primary and secondary coatings or with only a secondary coating, and then immediately subjected to radiation, typically ultraviolet (UV) radiation, to cure the compositions. The coated fibers are then arranged on a spool for storage, shipment and use. From time to time, the spooled fibers are subjected to temperature cycling conditions, i.e., from hot to cold, or vice versa, which can result in attenuation of light traveling through the fiber and therefore a loss of signal. Snagging of adjacent fibers has also been observed during the expansion which accompanies such temperature cycling. This snagging between adjacent fibers also results in attenuation of light traveling through the fibers. It is believed that the attenuation losses which result from temperature cycling of the spooled fiber can be a result of the surface characteristics of the optical fiber's secondary coating, particularly that the coefficient of friction of the secondary coating is not sufficiently low to allow the fibers to slide easily relative to one another.

Various conventional additives are available for reducing the coefficient of friction of cured resin compositions. Typically, however, the addition of conventional coefficient of friction-reducing agents to secondary coating compositions for optical fibers significantly and detrimentally effects one or more properties of the compositions, such as optical clarity, modulus or the like, thereby rendering the compositions unsuitable for use as a secondary coating for optical fibers. Particularly, conventional coefficient of friction-reducing agents such as silicone acrylate materials exhibit a degree of incompatibility with the aliphatic urethane oligomers which are often used as a base resin for secondary coating compositions. As a result of this incompatibility between the coefficient of friction-reducing agent and the base resin, the compositions exhibit varying degrees of haziness, opaqueness and/or coloration, surface blooming, reduced modulus and the like. Accordingly, it has been difficult to provide optical fibers with secondary coatings which exhibit a desirable combination of physical properties and a reduced coefficient of friction which allows spooled fiber to withstand temperature cycling without significant attenuation or loss of signal.

SUMMARY OF THE INVENTION

Accordingly, it is an object of the present invention to provide optical fibers which overcome disadvantages of the prior art. More particularly, it is an object of the present invention to provide optical fibers including one or more radiation-cured coatings which exhibit an advantageous combination of physical properties. It is a more specific object of the invention to provide optical fibers including a radiation-cured coating which exhibits a reduced coefficient of friction while maintaining a good combination of other physical properties and particularly while maintaining good optical clarity of the coating. It is a further object of the invention to provide coated optical fibers which, when spooled, may be subjected to temperature cycling conditions without developing surface defects or attenuation resulting in excessive signal loss.

These and additional objects are provided by the coated optical fibers according to the present invention. Specifically, the optical fibers of the present invention include a radiation-cured coating which is formed from a radiation-curable liquid coating composition. The radiation-curable compositions comprise a base resin formed from at least one aliphatic urethane acrylate oligomer, at least one acrylated or methacrylated compound selected from the group consisting of isobornyl acrylate, isobornyl methacrylate, alkanediol diacrylates, alkanediol dimethacrylates, alkoxylated derivatives thereof, and mixtures thereof, and a photoinitiator. In one embodiment, the radiation-curable liquid curable compositions further include at least one silicone compatibility agent which reduces the coefficient of friction of the radiation-cured coating without significantly disadvantageously effecting the physical properties of the coating. Particularly, the coating exhibits good optical clarity wherein the liquid coating composition has a UV absorbance at 500 nm relative to distilled water of less than about 0.04. In a second embodiment, the radiation-curable liquid coating compositions further include at least one functionalized silicone compound which reduces the coefficient of friction of the radiation-cured coating and at least one silicone compatibility agent, wherein the coating exhibits good optical clarity, and particularly the liquid coating composition exhibits a UV absorbance at 500 nm relative to distilled water of less than about 0.04, and the physical properties of the coating are not significantly disadvantageously effected. Thus, the coatings employed in the optical fibers according to the present invention also exhibit a good combination of abrasion resistance, particularly high modulus, and good moisture resistance. The optical fibers according to the present invention may be spooled in a conventional manner and, when subjected to temperature cycling, maintain efficient signal transmission, without significant attenuation or loss of signal or snagging or abrading of adjacent fibers.

These and additional objects and advantages provided by the optical fibers of the present invention will be more fully apparent in view of the following detailed description.

DETAILED DESCRIPTION

The coated optical fibers according to the present invention comprise a glass coated fiber and a radiation-cured coating on the fiber. The glass optical fiber may be of any design known in the art. For example, the glass fiber may comprise a glass core and a glass cladding layer. The core may comprise silica doped with oxides of germanium or phosphorous, or other impurity, and the cladding may comprise a pure or doped silicate, for example a fluorosilicate. In an alternate embodiment, the glass fibers may comprise a polymer-clad silica glass core. Examples of polymer claddings known in the art and suitable for use in this embodiment include organosiloxanes such as polydimethylsiloxane, fluorinated acrylic polymer or the like. Glass optical fibers of these types are well known in the art and are suitable for use in the present invention.

At least one radiation-cured coating according to the present invention is provided on the glass optical fiber. As will be discussed in detail below, the radiation-cured coating according to the present invention may be applied directly to the glass optical fiber or, alternatively, the radiation-cured coating may be applied to a primary coating which is adhered to the glass optical fiber. Preferably, the radiation-cured coating according to the present invention is the outer coating of the coated optical fibers according to the present invention, and more preferably is applied to a primary coating adhered to the glass fiber.

The radiation-cured coating included in the coated optical fibers of the present invention is formed from a radiation-curable liquid coating composition. Suitably, the compositions are ultraviolet (UV)-curable, although other radiation may be employed in combination with suitable photoinitiators, as will be apparent to those of ordinary skill in the art. The radiation-curable compositions comprise a base resin formed from at least one aliphatic urethane acrylate oligomer and at least one additional acrylated or methacrylated compound selected from a select group. Various aliphatic urethane acrylate oligomers are known in the art and are suitable for use in the base resin of the radiation-curable compositions according to the present invention. The backbone of most commercially available urethane acrylates is of a polyether or a polyester nature. Polyester-modified aliphatic urethane acrylate oligomers are preferred for use in the compositions of the present invention since such oligomers are generally more oxidatively stable. Accordingly, when the polyether-modified aliphatic urethane acrylate oligomers are employed, it is generally preferred that they are used in combination with one or more antioxidants and/or thermal stabilizers. Generally, the aliphatic urethane acrylate component provides the coating with advantageous abrasion resistance as evidenced by a high glass transition temperature, preferably at least about 50° C., and a high modulus, preferably at least about 40,000 psi.

The base resin of the radiation-curable compositions from which the radiation-cured coatings of the present invention are formed further comprise at least one acrylated or methacrylated compound selected from the group consisting of isobornyl acrylate, isobornyl methacrylate, alkanediol diacrylates, alkanediol dimethacrylates, alkoxylated derivatives thereof, and mixtures thereof. Generally, the alkane portion of the diol diacrylates or diol dimethacrylates may be of any suitable length and may be either saturated or unsaturated. In one preferred embodiment, the alkane moiety of this component comprises a $C_6$ to $C_{16}$ saturated alkane moiety. In further preferred embodiments, this component of the base resin comprises hexanediol diacrylate, alone or in combination with an additional component, for example isobornyl acrylate. This component of the base resin provides the liquid coating composition with a sufficiently low viscosity that the composition will be easily applied to form a continuous protective coating on the glass fibers. Additionally, this component provides good moisture resistance to the base resin composition and the resulting cured coating.

Optionally, the base resin may include one or more additional acrylated or methacrylated compounds having greater than two acrylate or methacrylate groups per molecule. These higher functionality acrylate and methacrylate monomers are well known in the art and include, but are not limited to, trimethyolpropane triacrylate, alkoxylated derivatives thereof, glycerol alkoxy triacrylates, trishydroxyethyl isocyanurate triacrylate, and mixtures thereof. These additional acrylated or methacrylated compounds, when included, may be employed in an amount up to about 50 weight percent of the liquid coating composition.

The base resin of the radiation-curable liquid coating compositions contains the aliphatic urethane acrylate oligomer and the acrylated or methacrylated compound of the aforementioned group in amounts which contribute to the optimization of the physical properties of the liquid coating composition and the radiation-cured coating. In a preferred embodiment, the liquid coating composition comprises from about 30 weight percent to about 90 weight percent of the aliphatic urethane acrylate oligomer and from about 5 weight percent to about 60 weight percent of the acrylated or methacrylated compound, based on the weight of the liquid coating composition. More preferably, the radiation-curable liquid coating compositions comprise from about 40 weight percent to about 80 weight percent of the aliphatic urethane acrylate oligomer and from about 5 weight percent to about 50 weight percent of the acrylated or methacrylated compound, based on the weight of the liquid coating compositions. Further preferred are radiation-curable liquid coating compositions comprising from about 50 weight percent to about 80 weight percent of the aliphatic urethane acrylate oligomer and from about 5 weight percent to about 40 weight percent of the acrylated or methacrylated compound, based on the weight of the radiation-curable liquid coating compositions.

A photoinitiator is also included in the radiation-curable liquid coating compositions from which the radiation-cured coating is formed. The photoinitiator, together with the oligomers, provides the radiation-curable compositions with a good cure speed when the compositions are applied to the glass optical fiber and exposed to radiation, without causing premature gelation or cure of the compositions. Additional important features of the photoinitiator are that the photoinitiator does not interfere with the optical clarity or cause yellowing of the cured coatings and that the photoinitiator is thermally stable. The radiation-curable liquid coating compositions are advantageously UV curable and various photoinitiators known in the art may be employed in the radiation-curable compositions of the present invention. Examples of photoinitiators suitable for use in the present compositions include, but are not limited to, benzoin or alkyl ethers thereof such as the benzophenones, phenyl methyl ketone (acetophenone), substituted acetophenones, acyl phosphine oxides and the like. Specific photoinitiators suitable for use in the present compositions include the following: hydroxycyclohexylphenyl ketone; hydroxymethylphenyl propanone; dimethoxyphenyl acetophenone; 2-methyl-1-[4-(methyl thio)phenyl]-2-morpholino-propanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-(2-hydroxy-2-propyl)ketone; diethoxyacetophenone; 2,2-di-sec-butoxyacetophenone; diethoxyphenyl acetophenone; diphenyl (2,4,6-trimethylbenzoyl) phosphine oxide; bis (2,6-dimethoxybenzoyl)(2,4,4-trimethylpentyl) phosphine oxide; bis (2,4,6-trimethylbenzoyl) phenyl phosphine oxide; ethyl-2,4,6-trimethylbenzoyl phenyl phosphinate; and mixtures of these. Preferred photoinitiators include substituted acetophenones such as hydroxycyclohexylphenyl ketone.

The photoinitiator is included in the radiation-curable liquid coating compositions in an amount effective to promote radiation cure of the compositions. Preferably, the photoinitiator is included in an amount of from about 1 weight percent to about 10 weight percent, based on the weight of the radiation-curable liquid coating compositions, and more preferably in an amount of from about 1 weight percent to about 5 weight percent.

In accordance with an important feature of the invention, the radiation-curable compositions further include at least one silicone compatibility agent which reduces the coefficient of friction of the radiation-cured coating, particularly without disadvantageously effecting other physical properties of the liquid coating composition or the cured coating, and particularly without disadvantageously effecting the optical clarity of the liquid coating composition. That is, while many silicone components are commercially available for the purpose of providing a reduction in surface frictional properties, typically these components are disadvantageous in that they disadvantageously affect the optical clarity, and often other properties, of the liquid compositions and/or the resulting cured coatings. Particularly, many conventional silicone friction-reducing components render the liquid coating compositions and/or the cured coatings hazy or opaque and often migrate to the coating surface, causing bloom or other undesirable features. Surface bloom is particularly disadvantageous for coated optical fibers which are subsequently ink printed as the surface bloom may decrease or inhibit adherence of the printing ink to the outer coating. While not intended to be limited by theory, the present inventors theorize that the undesirable effects of conventional silicone friction-reducing additives have been caused by the relatively high silicon content of the additives.

Accordingly, the radiation-curable compositions according to the present invention contain a silicone compatibility agent which reduces the coefficient of friction of the cured coating without disadvantageously effecting the physical properties of the liquid coating composition or the cured coating, and particularly without disadvantageously effecting the optical clarity of the liquid coating composition. While again not intending to be limited by theory, the present inventors believe that such silicone compatibility agents are of lower silicon content. In a preferred embodiment, the silicone compatibility agent includes one or more functional groups and even more preferred, the functional groups are reactive during the radiation curing process of the liquid coating composition, thereby assisting in preventing the compound from migrating. Suitable functionalized silicone compatibility agents include, but are not limited to, acrylated silicones, methacrylated silicones, marcapto-functional silicones, vinyl silicones, mixtures thereof and the like. In a further preferred embodiment, the silicone compatibility agent comprises a silicone acrylate component, preferably having a relatively high organic content. Silicone acrylate components having these features and suitable for use as the silicone compatibility agent in the present compositions will therefore be apparent to one of ordinary skill in the art and desirably will contain less silicon content, and consequently greater organic content, as compared with conventional silicone friction-reducing additives. One suitable silicone acrylate suitable for use as the compatibility agent in the radiation-curable compositions comprises a polyester-modified polydimethylsiloxane which is commercially available under the tradename Byk®-371 available from Byk-Chemie USA. This commercially available component is supplied in a solvent, for example xylene, and may be employed in the radiation-curable compositions either with the solvent or may be separated from the solvent before inclusion in the curable compositions. It is preferred that the silicone compatibility agent comprising a silicone acrylate be employed in a solventless form to avoid any disadvantageous effects the solvent may have on the radiation-curable compositions. Other commercially available products suitable for use as the silicone compatibility agent in the present invention include SilWet 7604 available from OSi Specialties/Witco Company and Tego® Rad 2100 available from Tego Chemie.

In a first embodiment, the silicone compatibility agent is included in the radiation-curable liquid coating compositions in an amount sufficient to reduce the coefficient of friction of the radiation-cured coating, without disadvantageously effecting the physical properties of the liquid coating compositions or the cured coatings and particularly without disadvantageously effecting the optical clarity of the liquid coating compositions. Particularly, the silicone compatibility agent is included in the radiation-curable liquid coating compositions in an amount sufficient to reduce the coefficient of friction while maintaining the optical clarity of the liquid coating composition so that the liquid coating composition exhibits a UV absorbance at 500 nm relative to distilled water of less than about 0.04. Throughout the present specification, UV absorbance at 500 nm relative to distilled water is measured by using a UV/visible spectrophotometer employing 1 cm quartz cuvettes (Perkin Elmer Lamda 14 instrument). Preferably, the silicone compatibility agent is employed in the radiation-curable liquid coating compositions in an amount which reduces the coefficient of friction of the radiation-cured coating without disadvantageously effecting optical clarity of the coating, wherein the liquid coating composition exhibits a UV absorbance at 500 nm relative to distilled water of less than about 0.02. In an alternate embodiment, the silicone compatibility agent is employed in the radiation-curable liquid coating compositions in an amount which reduces the coefficient of friction of the radiation-cured coating without disadvantageously effecting optical clarity of the coating, wherein the cured coating is substantially free of defects so that the coating, when viewed by the naked eye, is free of craters, fish eyes or other surface irregularities. More preferably, the silicone compatibility agent is included in the radiation-curable liquid coating compositions in an amount of from about 0.1 weight percent to about 10 weight percent, based on the weight of the radiation-curable liquid coating composition, and even more preferably in an amount of from about 0.1 weight percent to about 5 weight percent, based on the weight of the radiation-curable liquid coating composition.

In a second embodiment, the silicone compatibility agent is employed as a compatibilizing agent in the radiation-curable liquid coating compositions and allows the inclusion of a conventional silicone compound which further reduces the coefficient of friction of the radiation cured coating, without disadvantageously effecting the physical properties of the compositions, particularly without disadvantageously effecting the optical clarity of the liquid coating compositions or the cured coatings. Surprisingly, the present inventors have discovered that the use of a relatively small amount of the silicone compatibility agent allows the further addition of traditional friction-reducing silicone components in the compositions while maintaining the advantageous combination of physical properties of the compositions, and particularly while maintaining the good optical clarity of the liquid coating compositions and the cured coatings formed therefrom. Accordingly, in this embodiment, in addition to the aliphatic urethane acrylate oligomer and the acrylated or methacrylated compound which form the base resin, and the photoinitiator, the radiation-curable liquid coating compositions further include at least one functionalized silicone compound which reduces the coefficient of friction of the radiation-cured coating and at least one silicone compatibility agent. Advantageously, the liquid coating compositions exhibit good optical clarity and particularly a UV absorbance at 500 nm relative to distilled water of less than about 0.04.

The functionalized silicone compound typically includes a functional group which will render it reactive during the radiation curing process, thereby assisting in preventing the compound from migrating. Suitable functionalized silicone compounds include, but are not limited to, acrylated silicones, methacrylated silicones, mercapto-functional silicones, vinyl silicones, mixtures thereof and the like. Additionally, the functionalized silicone compound typically has a greater silicon content as compared with the silicone compatibility agent. Examples of commercially available functionalized silicone compounds which can reduce the coefficient of friction of the radiation-cured coating and are suitable for use in the radiation-curable compositions of the present invention include, but are not limited to, Tego® Rad 2200, 2500, 2600 and 2700, available from Tego Chemie, Ebecryl 350 and Ebecryl 1360, available from UCB Chemicals, Coat O Sil™ 3503 available from OSi Specialties/Witco Company, Dow Corning DC-30 and DC-31, and Croda UVS 500, available from Croda.

The functionalized silicone compound is included in the radiation-curable liquid coating compositions in an amount which reduces the coefficient of friction of the radiation-cured coating and which, in combination with the silicone compatibility agent, does not adversely effect the physical properties of the cured coating, and particularly does not disadvantageously effect the optical clarity of the liquid coating composition, whereby the liquid coating composition exhibits a UV absorbance of 500 nm relative to distilled water of less than about 0.04, and preferably less than about 0.02. In a preferred embodiment, the radiation-curable liquid coating compositions comprise from about 0.01 weight percent to about 5 weight percent of the functionalized silicone compound which reduces the coefficient of friction of the radiation-cured coating and from about 0.1 weight percent to about 5 weight percent of the silicone compatibility agent, based on the weight of the radiation-curable liquid coating composition. More preferably, the radiation-curable liquid coating compositions comprise from about 0.1 weight percent to about 1 weight percent of the functionalized silicone compound and from about 0.25 weight percent to about 1 weight percent of the silicone compatibility agent.

The radiation-curable liquid coating compositions may include additional additives or components which are conventionally known in the art for use in optical fiber coatings, including antioxidants, thermal stabilizers and the like, examples of which include, but are not limited to, organic phosphates, hindered phenols, hindered amines and mixtures thereof. These conventional additives are employed in conventional amounts of from about 0.01% by weight to about 3% by weight of the compositions, and more preferably from about 0.1% by weight to about 2% by weight, based on the weight of the radiation-curable liquid coating compositions.

The radiation-curable liquid coating compositions are applied to the glass optical fibers and cured by any methods known in the art. For example, the radiation-curable liquid coating compositions of the present invention may be applied to a glass fiber directly and cured in situ. Alternatively, when a primary coating is also employed, a wet-on-wet method, for example as disclosed in the Taylor U.S. Pat. No. 4,474,830, may be employed whereby the radiation-curable composition is applied on an uncured primary coating and both coatings are cured in situ. In yet another embodiment, the radiation-curable composition may be applied to a cured primary coating, after which the composition is cured to form a secondary coating. Preferably, the curing is effected by ultraviolet radiation although other types of radiation may be employed to affect curing as desired. Generally, the thickness of the cured coating will be dependent on the intended use of the optical fiber, although thicknesses of about 20 to 35 microns are suitable, with thicknesses of about 25 to 30 microns being preferred.

It is an important feature of the present invention that the coefficient of friction of the cured coating is reduced without disadvantageously effecting the modulus of the cured coating. In a preferred embodiment, the radiation-cured coating included on the optical fiber of the present invention has a 2.5% tensile modulus of at least about 40,000 psi, and preferably at least about 70,000 psi, as measured at 25° C. according to ASTM-D-882. This relatively high modulus provides advantageous abrasion resistant properties such as cut-through resistance and micro-bending resistance and contributes to the easy spooling and unspooling of the coated optical fibers.

The radiation-curable compositions and coated optical fibers according to the present invention are demonstrated by the following examples. In the examples and throughout the present specification, parts and percentages are by weight unless otherwise specified.

EXAMPLE 1

In this Example, various radiation-curable compositions containing an aliphatic urethane acrylate oligomer, hexanediol diacrylate (HDODA), a photoinitiator comprising Irgacure® 184 (1-hydroxycyclohexylphenyl ketone) and an applicator and cured using ultraviolet radiation (100 ppm $O_2$, D Lamp, 0.7 J/cm$^2$). The cured films were also visually inspected for appearance, i.e., clear, hazy or opaque. The cured films were subjected to conditioning for two hours, during which time they were maintained at a temperature of 23° C. (±2° C.) and a relative humidity of 50% (±5%). After conditioning, the kinetic coefficient of friction of the films was measured using an Altek lubricity sled test device (2000 gram, three ball sled, part no. 9505-A-10, speed of 20). The results of the coefficient of friction measurements are also set forth in Table I.

TABLE I

| Component, pbw | 1A | 1B | 1C | 1D | 1E | 1F | 1G | 1H | 1I |
|---|---|---|---|---|---|---|---|---|---|
| Aliphatic urethane acrylate | 88 | 87.9 | 87.78 | 87.56 | 87.12 | 84.47 | 87.47 | 87.69 | 76 |
| HDODA | 7 | 7 | 6.98 | 6.97 | 6.93 | 6.96 | 6.96 | 6.97 | 9 |
| Photoinitiator | 4 | 4 | 3.99 | 3.98 | 3.96 | 3.98 | 3.98 | 3.99 | 4 |
| Antioxidant | 1 | 1 | 1 | 0.99 | 0.99 | 0.99 | 0.99 | 1 | 1 |
| Silicone acrylate compatibility agent | — | — | — | — | — | — | 0.5 | 0.25 | 10 |
| Functionalized Silicone COF Reducing Agent(s) | — | 0.1 | 0.25 | 0.5 | 1 | 0.6 | 0.1 | 0.1 | — |
| COF, kinetic | >0.25 | 0.060 | 0.038 | 0.032 | 0.031 | 0.082 | 0.059 | 0.062 | 0.057 |
| Appearance - liquid | clear | slightly hazy | slightly hazy | hazy | near opaque | hazy | clear | clear | clear |
| Appearance - film | clear | | clear | clear | hazy at edges | | | | clear | antioxidant comprising Irganox® 1035 (a hindered polyphenol) are disclosed. The parts by weight (pbw) of the respective components employed in the compositions of this Example are set forth in Table I. With reference to Table I, composition 1A represents a conventional secondary coating composition which does not contain either a silicone acrylate compatibility agent or a functionalized silicone compound for reducing a coefficient of friction. Compositions 1B–1E are according to the prior art and contain a conventional functionalized silicone coefficient of friction reducing agent, namely Tego® Rad-2200, in the absence of a silicone compatibility agent according to the invention. Composition 1F contains a combination of conventional functionalized silicone coefficient of friction reducing agents, namely 0.5 parts by weight of Tego®Rad-2100 and 0.1 parts by weight of Tego®Rad-2200, based on 100 parts by weight of the composition, in the absence of a silicone compatibility agent according to the invention. Compositions 1G and 1H are according to the present invention and contain both a silicone compatibility agent, namely Byk®-371, and a functionalized silicone compound, Tego®Rad-2200. Composition 1I is also according to the present invention and contains the silicone compatibility agent, in the absence of the functionalized silicone compound. In composition 1I, the silicone compatibility agent comprises Byk®-371, from which the solvent has been removed prior to its addition to the liquid mix of remaining components.

All of the compositions were visually inspected in their liquid form to determine appearance, i.e., clear, hazy or opaque, as noted in Table I. Each liquid composition was applied as a 6 mil coating to a flat glass sheet using a Bird From Table I, it is apparent that while compositions 1B–1F exhibit reduced coefficients of friction as compared with the conventional composition 1A, they are disadvantageous for use in coated optical fibers according to the present invention owing to their hazy appearance either before and/or after curing. On the other hand, compositions 1G–1I according to the present invention are advantageous in that these compositions exhibit a reduced coefficient of friction as compared with conventional composition 1A while also exhibiting good optical clarity.

Compositions 1A, 1G and 1H were also subjected to conditioning at 5° C. for 16 hours, after which they were again visually inspected. Each of the conditioned compositions remained optically clear.

EXAMPLE 2

In this Example, additional radiation-curable compositions 2A–2D according to the present invention were prepared. The components of the compositions are those described in Example 1 and were used in the amounts set forth in Table II, in parts by weight (pbw). In composition 2A, the Byk® 371 compatibility agent was included in solvent-containing form, while in compositions 2B–2D, the solvent was removed from the Byk® 371 before it was included in the compositions. Each composition was applied as a 6 mil coating to a glass plate and cured as described in Example 1. The optical clarity of the liquid coating compositions, as the UV absorbance at 500 nm relative to distilled water, was measured and the results are set forth in Table II. The static and kinetic coefficients of friction of the cured films were also measured as described in Example 1 (three ball sled at a speed of 20), the results of which are indicated in Table II. Compositions 2B and 2D were conditioned for 48 hours at 23° C. (±2° C.), while composition 2C was conditioned for 16 hours at 23° C. (±2° C.) prior to measurement of the coefficient of friction properties.

TABLE II

| Component, pbw | 2A | 2B | 2C | 2D |
| --- | --- | --- | --- | --- |
| Aliphatic urethane acrylate | 87.84 | 87.34 | 87.12 | 86.9 |
| HDODA | 6.99 | 6.95 | 6.93 | 6.91 |
| Photoinitiator | 3.99 | 3.97 | 3.96 | 3.95 |
| Antioxidant | 1 | 0.99 | 0.99 | 0.99 |
| Silicone acrylate compatibility agent | 0.13 | 0.5 | 0.75 | 1 |
| Functionalized Silicone COF Reducing Agent | 0.05 | 0.25 | 0.25 | 0.25 |
| UV Absorbance at 500 nm | 0.015 | 0.028 | 0.007 | 0.004 |
| COF, static | | 0.079 | 0.059 | 0.083 |
| COF, kinetic | | 0.057 | 0.040 | 0.059 |

The results set forth in Table II demonstrate the compositions according to the present invention exhibit excellent optical clarity and improved reductions in coefficient of friction properties.

EXAMPLE 3

Additional compositions 3A and 3B according to the present invention were prepared and used to form cured film coatings on glass plates in accordance with the procedures described in Example 1. Composition 3C was also prepared to demonstrate conventional coatings. The components of the compositions are those described in Example 1, with the Byk® 371 being used in its solventless form, and were employed in the amounts set forth in Table III, in parts by weight (pbw). The resulting films were subjected to measurement of both static and kinetic coefficients of friction in accordance with the procedures described in Examples 1 and 2 after conditioning for 16 hours at 23° C. (±2° C.) and 50% (±5%) relative humidity. The films were also subjected to measurement of modulus at 25° C. according to ASTM-D-882. The results of these measurements are also set forth in Table III.

TABLE III

| Component, pbw | 3A | 3B | 3C |
| --- | --- | --- | --- |
| Aliphatic urethane acrylate | 86.8 | 87.5 | 88 |
| HDODA | 7.0 | 7.0 | 7.0 |
| Photoinitiator | 4 | 3 | 4 |
| Antioxidant | 1 | 1 | 1 |
| Silicone acrylate compatibility agent | 1 | 1 | — |
| Functionalized Silicone COF Reducing Agent | 0.2 | 0.5 | — |
| COF, static | 0.093 | 0.066 | >0.25 |
| COF, kinetic | 0.074 | 0.053 | >0.25 |
| Modulus, 25° C. | 89,800 psi | 98,500 psi | 92,100 psi |

The results set forth in Table III demonstrate that the compositions used to form the cured coating according to the present invention provide coatings which exhibit high modulus and improved reductions in coefficient of friction properties.

EXAMPLE 4

In this example, several additional radiation-curable compositions 4A and 4B according to the present invention were prepared. In the compositions of this example, a mixture of two aliphatic urethane acrylates were employed together with hexanediol diacrylate as the base resin. The remaining components of the compositions are those described in Example 1, with the Byk® 371 being used in its solventless form, and were employed in the amounts set forth in Table IV, in parts by weight (pbw). Each composition was applied as a 6 mil coating to a glass plate and cured as described in Example 1. After three hours of conditioning at 23° C. (±20° C.) and 50% (±5%) humidity, the static and kinetic coefficients of friction of the cured films were measured in accordance with the procedure set forth in Example 1. The results of these measurements are also set forth in Table IV.

TABLE IV

| Component, pbw | 4A | 4B |
| --- | --- | --- |
| Aliphatic urethane acrylate | 72 | 72 |
| HDODA | 22 | 22 |
| Photoinitiator | 4 | 4 |
| Antioxidant | 1 | 1 |
| Silicone acrylate compatibility agent | 1 | 1 |
| Functionalized Silicone COF Reducing Agent | — | 0.1 |
| COF, static | 0.143 | 0.086 |
| COF, kinetic | 0.130 | 0.076 |

Compositions similar to compositions 4A and 4B, which did not contain either a silicone compatibility agent or a functionalized silicone coefficient of friction reducing agent, exhibited static and kinetic coefficients of friction of greater than about 0.25 and 0.20, respectively. Thus, the compositions according to the present invention provided a significant decrease in the coefficient of friction properties. Additionally, these compositions 4A and 4B exhibited similar optical clarity.

The present examples and specific embodiments set forth in the present specification are provided to illustrate various embodiments of the invention and are not intended to be limiting thereof. Additional embodiments within the scope of the present claims will be apparent to one of ordinary skill in the art.

What is claimed is:

1. A coated optical fiber, comprising a glass optical fiber and a radiation-cured coating on the fiber, wherein the coating is formed from a radiation-curable liquid coating composition comprising at least one aliphatic urethane acrylate oligomer, at least one acrylated or methacrylated compound selected from the group consisting of isobornyl acrylate, isobornyl methacrylate, alkanediol diacrylates, alkanediol dimethacrylates, alkoxylated derivatives thereof, and mixtures thereof, a photoinitiator, and at least one silicone compatibility agent which reduces the coefficient of friction of the radiation-cured coating, wherein the liquid coating composition exhibits a UV absorbance at 500 nm relative to distilled water of less than about 0.04.

2. A coated optical fiber as defined by claim 1, wherein the radiation-curable liquid coating composition comprises from about 30 weight percent to about 90 weight percent of the aliphatic urethane acrylate oligomer, from about 5 weight percent to about 60 weight percent of the acrylated or methacrylated compound selected from the group consisting of isobornyl acrylate, isobornyl methacrylate, alkanediol diacrylates, alkanediol dimethacrylates, alkoxylated derivatives thereof, and mixtures thereof, from about 1 weight percent to about 10 weight percent of the photoinitiator, and from about 0.1 weight percent to about 10 weight percent of the silicone compatibility agent.

3. A coated optical fiber as defined by claim 1, wherein the radiation-curable liquid coating composition comprises from about 40 weight percent to about 80 weight percent of the aliphatic urethane acrylate oligomer, from about 5 weight percent to about 50 weight percent of the acrylated or methacrylated compound selected from the group consisting of isobornyl acrylate, isobornyl methacrylate, alkanediol diacrylates, alkanediol dimethacrylates, alkoxylated derivatives thereof, and mixtures thereof, from about 1 weight percent to about 5 weight percent of the photoinitiator, and from about 0.1 weight percent to about 5 weight percent of the silicone compatibility agent.

4. A coated optical fiber as defined by claim 1, wherein the at least one acrylated or methacrylated compound in the radiation-curable liquid coating composition comprises hexanediol diacrylate or dimethacrylate.

5. A coated optical fiber as defined by claim 1, wherein the at least one acrylated or methacrylated compound in the radiation-curable liquid coating composition comprises a mixture of hexanediol diacrylate and isobornyl acrylate.

6. A coated optical fiber as defined by claim 1, wherein the photoinitiator in the radiation-curable composition comprises hydroxycylcohexyl phenyl ketone.

7. A coated optical fiber as defined by claim 1, wherein the photoinitiator in the radiation-curable liquid coating composition comprises an acyl phosphine oxide compound.

8. A coated optical fiber as defined by claim 1, wherein the silicone compatibility agent in the radiation-curable liquid coating composition includes a functional group.

9. A coated optical fiber as defined by claim 1, wherein the silicone compatibility agent in the radiation-curable liquid coating composition includes a reactive group.

10. A coated optical fiber as defined by claim 1, wherein the silicone compatibility agent in the radiation-curable liquid coating composition includes an acrylate group.

11. A coated optical fiber as defined by claim 1, wherein the silicone compatibility agent in the radiation-curable liquid coating composition comprises a polyester-modified polydimethylsiloxane.

12. A coated optical fiber as defined by claim 1, wherein the radiation-curable liquid coating composition exhibits a UV absorbance at 500 nm relative to distilled water of less than about 0.02.

13. A coated optical fiber as defined by claim 1, wherein the coating is an outer secondary coating and is provided on a primary coating on the glass optical fiber.

14. A coated optical fiber as defined by claim 1, wherein the radiation-curable liquid coating composition further comprises an additional acrylated or methacrylated compound having greater than two acrylate or methacrylate groups per molecule.

15. A coated optical fiber as defined by claim 14, wherein the additional acrylate or methacrylate compound comprises trimethylolpropane triacrylate, alkoxylated derivatives thereof, glycerol alkoxy triacrylates, trishydroxyethyl isocyanurate triacrylate, or mixtures thereof.

16. A coated optical fiber, comprising a glass optical fiber and a radiation-cured coating on the fiber, wherein the coating is formed from a radiation-curable liquid coating composition comprising at least one aliphatic urethane acrylate oligomer, at least one acrylated or methacrylated compound selected from the group consisting of isobornyl acrylate, isobornyl methacrylate, alkanediol diacrylates, alkanediol dimethacrylates, alkoxylated derivatives thereof, and mixtures thereof, a photoinitiator, at least one functionalized silicone compound which reduces the coefficient of friction of the radiation-cured coating, and at least one silicone compatibility agent, wherein the liquid coating composition exhibits a UV absorbance at 500 nm relative to distilled water of less than about 0.04.

17. A coated optical fiber as defined by claim 16, wherein the radiation-curable liquid coating composition comprises from about 30 weight percent to about 90 weight percent of the aliphatic urethane acrylate oligomer, from about 5 weight percent to about 60 weight percent of the acrylated or methacrylated compound selected from the group consisting of isobornyl acrylate, isobornyl methacrylate, alkanediol diacrylates, alkanediol dimethacrylates, alkoxylated derivatives thereof, and mixtures thereof, from about 1 weight percent to about 10 weight percent of the photoinitiator, from about 0.01 weight percent to about 5 weight percent of the functionalized silicone compound which reduces the coefficient of friction of the radiation-cured coating, and from about 0.1 weight percent to about 5 weight percent of the silicone compatibility agent.

18. A coated optical fiber as defined by claim 16, wherein the radiation-curable liquid coating composition comprises from about 40 weight percent to about 80 weight percent of the aliphatic urethane acrylate oligomer, from about 5 weight percent to about 50 weight percent of the acrylated or methacrylated compound selected from the group consisting of isobornyl acrylate, isobornyl methacrylate, alkanediol diacrylates, alkanediol dimethacrylates, alkoxylated derivatives thereof, and mixtures thereof, from about 1 weight percent to about 5 weight percent of the photoinitiator, from about 0.1 weight percent to about 1 weight percent of the functionalized silicone compound which reduces the coefficient of friction of the radiation-cured coating, and from about 0.25 weight percent to about 1 weight percent of the silicone compatibility agent.

19. A coated optical fiber as defined by claim 17, wherein the radiation-curable liquid coating composition comprises from about 0.1 weight percent to about 1 weight percent of the functionalized silicone compound and from about 0.25 weight percent to about 1 weight percent of the silicone compatibility agent.

20. A coated optical fiber as defined by claim 16, wherein the at least one acrylated or methacrylated compound in the radiation-curable liquid coating composition comprises hexanediol diacrylate or dimethacrylate.

21. A coated optical fiber as defined by claim 16, wherein the at least one acrylated or methacrylated compound in the radiation-curable liquid coating composition comprises a mixture of hexanediol diacrylate and isobornyl acrylate.

22. A coated optical fiber as defined by claim 16, wherein the photoinitiator in the radiation-curable liquid coating composition comprises hydroxycylcohexyl phenyl ketone.

23. A coated optical fiber as defined by claim 16, wherein the photoinitiator in the radiation-curable liquid coating composition comprises an acyl phosphine oxide compound.

24. A coated optical fiber as defined by claim 16, wherein the silicone compatibility agent in the radiation-curable liquid coating composition includes a functional group.

25. A coated optical fiber as defined by claim 16, wherein the silicone compatibility agent in the radiation-curable liquid coating composition includes a reactive group.

26. A coated optical fiber as defined by claim 16, wherein the silicone compatibility agent in the radiation-curable liquid coating composition includes an acrylate group.

27. A coated optical fiber as defined by claim 16, wherein the silicone compatibility agent in the radiation-curable liquid coating composition comprises a polyester-modified polydimethylsiloxane.

28. A coated optical fiber as defined by claim 16, wherein the functionalized silicone compound which reduces the coefficient of friction of the radiation-cured coating is selected from the group consisting of acrylated silicones, methacrylated silicones, mercapto-functional silicones, vinyl silicones and mixtures thereof.

29. A coated optical fiber as defined by claim 16, wherein the functionalized silicone compound which reduces the coefficient of friction of the radiation-cured coating comprises an acrylated silicone.

30. A coated optical fiber as defined by claim 16, wherein the liquid coating composition exhibits a UV absorbance at 500 nm relative to distilled water of less than about 0.02.

31. A coated optical fiber as defined by claim 16, wherein the coating is an outer secondary coating and is provided on a primary coating adhered to the glass optical fiber.

32. A coated optical fiber as defined by claim 16, wherein the radiation-curable liquid coating composition further comprises an additional acrylated or methacrylated compound having greater than two acrylate or methacrylate groups per molecule.

33. A coated optical fiber as defined by claim 16, wherein the additional acrylate or methacrylate compound comprises trimethylolpropane triacrylate, alkoxylated derivatives thereof, glycerol alkoxy triacrylates, trishydroxyethyl isocyanurate triacrylate, or mixtures thereof.

34. A coated optical fiber as defined by claim 1, comprising from about 0.1 weight percent to about 10 weight percent of the silicone compatibility agent.

35. A coated optical fiber as defined by claim 1, wherein the radiation-cured coating has a thickness of about 20 to 35 microns.

36. A coated optical fiber as defined by claim 16, wherein the radiation-cured coating has a thickness of about 20 to 35 microns.

37. A coated optical fiber as defined by claim 1, wherein the radiation-cured coating is a primary or secondary coating.

38. A coated optical fiber as defined by claim 16, wherein the radiation-cured coating is a primary or secondary coating.

* * * * *